(12) United States Patent
Ireland

(10) Patent No.: US 8,291,375 B2
(45) Date of Patent: Oct. 16, 2012

(54) ATTRIBUTE-BASED COMPONENT PROGRAMMING SYSTEM AND METHODOLOGY FOR OBJECT-ORIENTED LANGUAGES

(75) Inventor: Evan P. Ireland, Khandallah (NZ)

(73) Assignee: Sybase, Inc., Dublin, CA (US)

( * ) Notice: Subject to any disclaimer, the term of this patent is extended or adjusted under 35 U.S.C. 154(b) by 2525 days.

(21) Appl. No.: 10/709,917

(22) Filed: Jun. 4, 2004

(65) Prior Publication Data
US 2005/0216885 A1 Sep. 29, 2005

Related U.S. Application Data

(60) Provisional application No. 60/521,306, filed on Mar. 29, 2004.

(51) Int. Cl.
G06F 9/44 (2006.01)
(52) U.S. Cl. ........................................ 717/107
(58) Field of Classification Search .................. 717/117, 717/107
See application file for complete search history.

(56) References Cited

U.S. PATENT DOCUMENTS

| | | | |
|---|---|---|---|
| 5,247,669 A | 9/1993 | Abraham et al. | 707/103 |
| 5,313,636 A | 5/1994 | Noble et al. | 707/1 |
| 5,487,141 A | 1/1996 | Cain et al. | 715/764 |
| 5,499,365 A | 3/1996 | Anderson et al. | 707/203 |
| 5,519,866 A | 5/1996 | Lawrence et al. | 717/162 |
| 5,537,630 A | 7/1996 | Berry et al. | 715/763 |
| 5,560,014 A | 9/1996 | Imamura | 717/108 |
| 5,913,063 A * | 6/1999 | McGurrin et al. | 717/109 |
| 5,950,213 A | 9/1999 | Iida et al. | 715/505 |
| 6,014,666 A | 1/2000 | Helland et al. | 707/9 |
| 6,083,276 A * | 7/2000 | Davidson et al. | 717/107 |
| 6,154,875 A | 11/2000 | Tanaka et al. | 717/107 |
| 6,167,564 A | 12/2000 | Fontana et al. | 717/104 |
| 6,169,993 B1 | 1/2001 | Shutt et al. | 707/103 |
| 6,182,277 B1 * | 1/2001 | DeGroot et al. | 717/115 |
| 6,182,278 B1 | 1/2001 | Hamada et al. | 717/107 |
| 6,480,856 B1 | 11/2002 | McDonald et al. | 707/100 |

(Continued)

OTHER PUBLICATIONS

Sun Microsystems, Enterprise Java Beans Specification, Version 2.1, Final Release, Sun Microsystems, Sun Microsystems, Inc., Mountain View, CA, Nov. 12, 2003.
Gosling, J. et al., Java Language Specification, 2nd Ed. (Chapters 1-5), Sun Microsystems, Inc., Mountain View, CA, Jun. 2000.
Bollert, K., On Weaving Aspects, International Workshop on Aspect Oriented Programming at ECOOP99 (European Conference for Object Oriented Programing, Jun. 1999.
Gosling, J. et al., The Java Language Environment, A White Paper, Sun Microsystems Computer Company, Oct. 1995.

Primary Examiner — Philip Wang
(74) Attorney, Agent, or Firm — Sterne, Kessler, Goldstein and Fox P.L.L.C.

(57) ABSTRACT

An attribute-based component programming system and methodology for object-oriented languages is described. In one embodiment, for example, a method is described for dynamically generating program code adding behavior to a program based on attributes, the method comprises steps of: adding a component object to a program class of the program to create a component; defining at least one attribute specifying declaratively behavior to be added to the program; associating the at least one attribute with the component; and in response to instantiation of the component at runtime, generating a subclass based on the program class and the at least one attribute, the subclass including dynamically generated program code based on the at least one attribute.

56 Claims, 5 Drawing Sheets

U.S. PATENT DOCUMENTS

| | | | |
|---|---|---|---|
| 6,490,719 B1 | 12/2002 | Thomas | 717/107 |
| 6,637,021 B1 | 10/2003 | Dubey | 717/108 |
| 6,721,758 B1 * | 4/2004 | Jex et al. | 707/103 R |
| 6,820,249 B1 | 11/2004 | Jachmann et al. | 717/108 |
| 6,848,110 B2 | 1/2005 | Salmon | 719/328 |
| 6,859,921 B2 | 2/2005 | Connor et al. | 717/120 |
| 6,870,546 B1 | 3/2005 | Arsenault et al. | 345/619 |
| 6,964,033 B2 * | 11/2005 | Wallman et al. | 717/118 |
| 6,996,801 B2 * | 2/2006 | Yoneyama | 717/107 |
| 7,055,143 B2 * | 5/2006 | Ringseth et al. | 717/143 |
| 2002/0059314 A1 * | 5/2002 | Yoneyama | 707/200 |
| 2002/0078071 A1 * | 6/2002 | Foster | 707/200 |
| 2003/0055936 A1 * | 3/2003 | Zhang et al. | 709/223 |
| 2005/0050520 A1 * | 3/2005 | Motoyama et al. | 717/123 |

* cited by examiner

ATTRIBUTE-BASED COMPONENT PROGRAMMING SYSTEM AND METHODOLOGY FOR OBJECT-ORIENTED LANGUAGES

CROSS REFERENCE TO RELATED APPLICATIONS

The present application is related to and claims the benefit of priority of the following commonly-owned, presently-pending provisional application(s): application Ser. No. 60/521,306, filed Mar. 29, 2004, entitled "Attribute-Based Component Programming System and Methodology for Object-Oriented Languages", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, created: Mar. 26, 2004, 11:59 am, size: 73.8 KB; Object ID: File No. 1; Object Contents: Source Code.

BACKGROUND OF INVENTION

1. Field of the Invention

The present invention relates generally to information processing environments and, more particularly, to an attribute-based component programming system and methodology for object-oriented programming languages.

2. Description of the Background Art

Before a digital computer may accomplish a desired task, it must receive an appropriate set of instructions. Executed by the computer's microprocessor, these instructions, collectively referred to as a "computer program", direct the operation of the computer. Expectedly, the computer must understand the instructions which it receives before it may undertake the specified activity.

Owing to their digital nature, computers essentially only understand "machine code", i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C++, Pascal, or more recently Java and C#. These languages allow data structures and algorithms to be expressed in a style of writing that is easily read and understood by fellow programmers.

A program called a "compiler" translates these instructions into the requisite machine language. In the context of this translation, the program written in the high-level language is called the "source code" or source program. The ultimate output of the compiler is a compiled module such as a compiled C "object module", which includes instructions for execution ultimately by a target processor, or a compiled Java class, which includes bytecodes for execution ultimately by a Java virtual machine. A Java compiler generates platform-neutral "bytecodes"—an architecturally neutral, intermediate format designed for deploying application code efficiently to multiple platforms.

During application development with object-oriented programming languages such as Java or C#, many times it would be beneficial to be able to program in a declarative style, that is to specify what needs to be achieved (declarative behavior) without specifying directly how it is to be achieved (implementation). Object-oriented programming generally promotes software re-use through inheritance or delegation, and the coding of inheritance or delegation to re-use existing implementation code can be seen as an expression of what needs to be achieved, but it is not declarative.

A suitable declarative approach can enhance the productivity of object-oriented programming. A declarative approach can help to avoid bugs that are due to incorrect placement of procedural programming constructs. It can simplify the process of re-use through inheritance, since inheritance sometimes requires the coding of a non-trivial interaction between the caller and the callee (superclass) objects. It can simplify the process of re-use through delegation, since delegation sometimes requires the coding of a non-trivial interaction between the caller and the callee (delegate) objects. Also, it can support substitutability of implementations (usually delegate classes) without the need to code callers using a factory design pattern. In addition, a declarative approach can support dynamic reconfiguration of applications without requiring changes to application code, including the possibility that new declarative behaviors can be added to existing applications.

Among the prior approaches that have been utilized for defining re-usable aspects of program behavior is aspect-oriented programming (AOP). With aspect-oriented programming external metadata or new language syntax is used to define re-usable aspects of program behavior, with "pointcuts" designating locations in existing code which are to be modified, and "advice" which specifies how to modify (i.e., alter, extend, or wrap) the designated code. Aspect-oriented programming is based on the idea that systems are better programmed by specifying the various concerns (properties or areas of interest) of a system and some description of their relationships and then relying on mechanisms in the underlying aspect-oriented environment to compose them together into a coherent program. Aspect-oriented software development makes it possible to modularize crosscutting aspects of a system. Like objects, aspects may arise at any stage of the software lifecycle, including requirements specification, design, implementation, and so forth. Common examples of crosscutting aspects are design or architectural constraints, systemic properties or behaviors (e.g., logging and error recovery), and features. For further information on aspect-oriented programming, see e.g., Bollert, K. "On Weaving Aspects", in International Workshop on Aspect Oriented Programming at ECOOP99 (European Conference for Object Oriented Programming, June 1999), the disclosure of which is hereby incorporated by reference. An example of an aspect-oriented programming system is the AspectJ AOP programming system for Java™ available from the Eclipse Foundation. However, with the AspectJ programming system, source code must be available before aspects can be applied, and aspects cannot be applied or inspected at run-time. In addition, aspects can be somewhat difficult to understand and use.

Another technique is to use internal metadata with compiler support. Internal metadata (usually referred to as "attributes") or new language syntax is included in the code. The compiler processes the attributes and generates additional code to implement the desired declarative behavior and/or save the attributes for later retrieval at run-time. Callers use direct class-level calls, as they would if the attributes had not been present. A well-known example of this is the support for "attributes" in the Microsoft .NET platform. Some system-defined attributes result in code generation. There is no explicit support for user-defined attributes that result in code generation, but user-defined attributes can be retrieved at run-time. User-defined declarative behavior must use explicit inheritance or delegation to call superclasses or delegates, which can then fetch attribute values and act upon them.

Metadata can be used with interfaces, a code generator, and a factory pattern. Metadata (sometimes referred to as a deployment descriptor) is defined externally to, or perhaps within, the application source code. A static code generator is run over this metadata to generate additional classes which implement the desired declarative behavior as well as delegating to the original application code. At run time, a factory design pattern is used to obtain instances of the interfaces, and callers use indirect (interface) calls. A well-known example of this is the Enterprise JavaBeans (EJB) architecture, which uses user-defined Java classes, interfaces, and XML deployment descriptors. Tools such as XDoclet can generate the interfaces and XML deployment descriptors from annotations (attributes) within the application source code (comments or static data values).

Metadata, combined with interfaces, dynamic proxies, and a factory pattern is another alternative technique. Metadata is defined externally to, or perhaps within, the application source code. At run time, a factory design pattern is used to obtain instances of the interfaces via dynamic proxies—instances of generic classes that can be precoded to implement arbitrary interfaces using run-time reflection and metadata, implementing the desired declarative behavior as well as delegating to the original application code. Callers use indirect (interface) calls. This technique is also used within some EJB/middleware implementations. It is generally less efficient than the use of a static code generator (dynamic, generic classes are often multi-purpose, with expensive code paths being executed to repeatedly check the metadata). However, this technique permits dynamic reconfiguration if the metadata is external to the application source code.

Metadata can also be used with interfaces, request interceptors, and a factory pattern. A static code generator is run over this metadata to generate additional classes which implement the desired declarative behavior by delegating to a configurable set of request interceptors, as well as delegating to the original application code. At run time, a factory design pattern is used to obtain instances of the interfaces, and callers use indirect (interface) calls. This technique is also used within some EJB/middleware implementations. It is generally less efficient than the sole use of a static code generator (interceptors sometimes have expensive code paths being executed to repeatedly check the metadata). As with dynamic proxies, this technique permits dynamic reconfiguration if the metadata is external to the application source code. In practice, it is not uncommon to find a combination of code generation, dynamic proxies, and request interceptors in use within a single application.

Alternatively, another technique is the use of metadata with load-time code modification. At run-time, when classes are being loaded, their instruction codes are modified by a mini-compiler (dynamic code generator) that has access to the metadata. The desired declarative behaviors are added at this time. After class loading, callers use direct class-level calls, as they would if the metadata had not been present. Some recent implementations of aspect-oriented programming use this technique. This technique permits dynamic reconfiguration if the metadata is external to the application source code. However, this approach has a number of drawbacks, including that code debugging is difficult due to lack of source code for the modified instruction codes generated by load-time code modification. Also, this approach constrains the types of code modifications to those that can be made by the mini-compiler and it also typically requires complex class loader implementations.

What is needed is an improved solution for developing programs in a declarative style that is relatively easy to understand and use and provides for flexibility in implementation. The solution should support user-defined attributes and both static and dynamic code generation. Ideally, the solution should also support dynamic program reconfiguration. The present invention provides a solution for these and other needs.

SUMMARY OF INVENTION

An attribute-based component programming system and methodology for object-oriented languages is described. In one embodiment, for example, a method of the present invention is described for dynamically generating program code adding behavior to a program based on attributes, the method comprises steps of: adding a component object to a program class of the program to create a component; defining at least one attribute specifying declaratively behavior to be added to the program; associating the at least one attribute with the component; and in response to instantiation of the component at runtime, generating a subclass based on the program class and the at least one attribute, the subclass including dynamically generated program code based on the at least one attribute.

In another embodiment, for example, a system of the present invention for dynamically generating program code based on declarative attributes is described that comprises: a component module for creating a component from a program class based on adding a component object to the program class; an attribute module for defining at least one declarative attribute specifying behavior to be added to the program class and associating the at least one attribute with the component; and a module for generating a subclass of the program class in response to instantiation of the component, the subclass including dynamically generated program code based on the at least one declarative attribute.

In yet another embodiment, for example, a method of the present invention is described for adding behavior to an application without access to application source code, the method comprises steps of: defining at least one attribute specifying declaratively behavior which is desired to be added to an application without access to the application source code; storing the at least one attribute in a properties file external to the application; creating a dynamic attributes class based on the properties file; compiling the application and the dynamic attributes class; and generating a subclass which includes dynamically generated code adding behavior to application based on the at least one attribute.

DETAILED DESCRIPTION

Glossary

Figure 1:
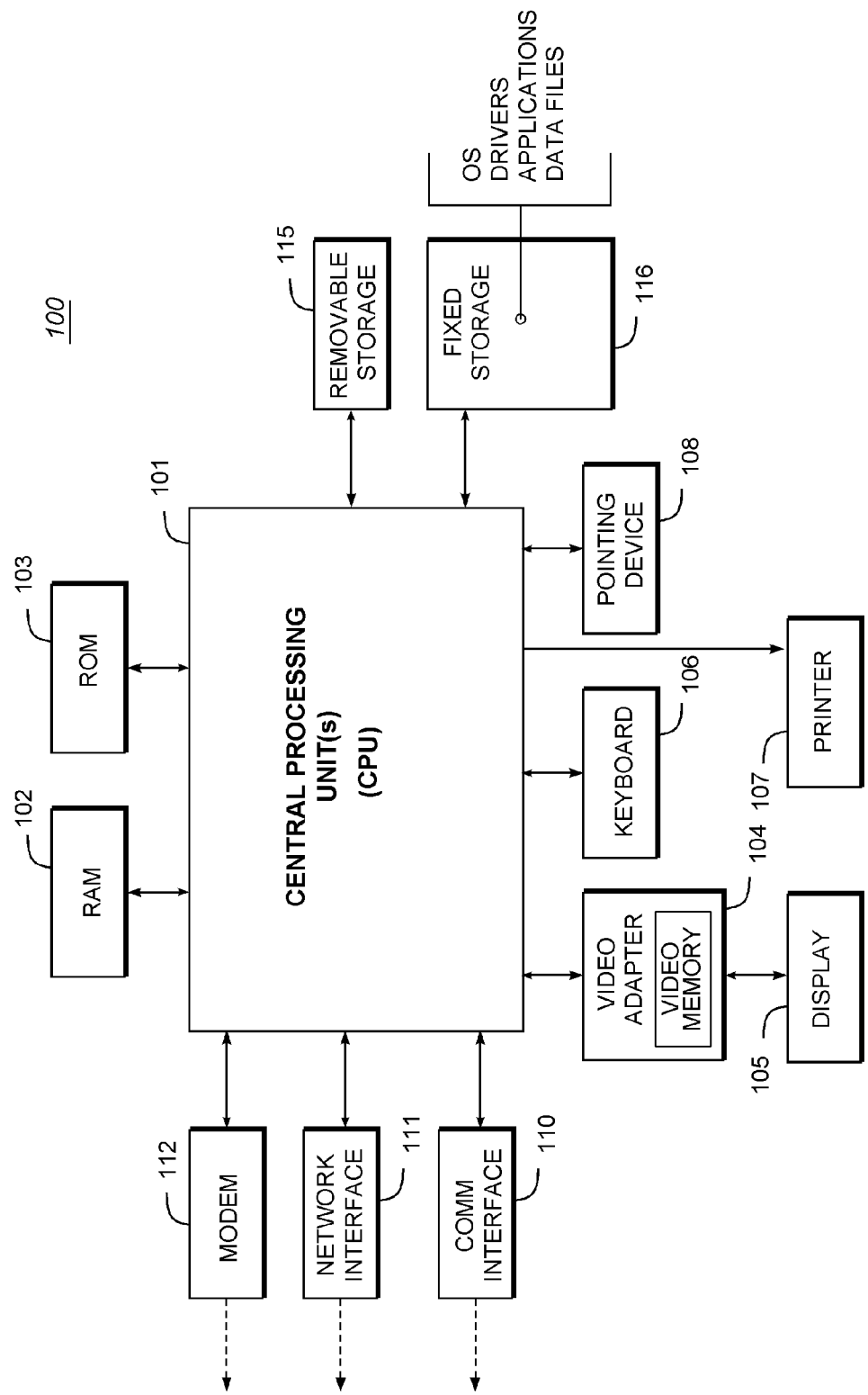
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Attributes: The term attributes refers to a language construct that programmers (developers) use to add additional information (i.e., metadata) to code elements (e.g., assemblies, modules, members, types, return values, and parameters) to extend their functionality. The attributes provided by the system and methodology of the present invention provide a flexible and extensible way of modifying the behavior of a program or a class or a method of a program. In accordance with the teachings of the present invention, attributes may comprise "active" metadata that generates other code for inclusion in a program class or subclass. For example, a developer writing a program class may annotate the class with comments which contain attributes or may define attributes in an external properties file. In either case, the system and methodology of the present invention makes it possible to generate code based on these attributes which may modify the behavior of the class as it executes at runtime.

Bytecode: A virtual machine executes virtual machine low-level code instructions called bytecodes. Both the Microsoft .NET virtual machine and the Sun Microsystems Java™ virtual machine provide a compiler to transform the respective source program (i.e., a Java™ program or a C# program, respectively) into virtual machine bytecodes.

Compiler: A compiler is a program which translates source code into binary code to be executed by a computer. The compiler derives its name from the way it works, looking at the entire piece of source code and collecting and reorganizing the instructions. Thus, a compiler differs from an interpreter which analyzes and executes each line of code in succession, without looking at the entire program. A Java compiler translates source code written in the Java programming language into bytecode for the Java virtual machine.

EJB: "EJB" refers to Enterprise JavaBeans, a Java™ API developed by Sun Microsystems that defines a component architecture for multi-tier client/server systems. For further information on Enterprise JavaBeans, see e.g., "Enterprise JavaBeans Specification, version 2.1" available from Sun Microsystems, the disclosure of which is hereby incorporated by reference.

Interpreter: An interpreter is a module that alternately decodes and executes every statement in some body of code. A Java runtime interpreter decodes and executes bytecode for the Java virtual machine.

Java: Java™ is a general purpose programming language developed by Sun Microsystems. Java™ is an object-oriented language similar to C++, but simplified to eliminate language features that cause common programming errors. Java™ source code files (files with a .java extension) are compiled into a format called bytecode (files with a .class extension), which can then be executed by a Java™ interpreter. Compiled Java™ code can run on most computers because Java™ interpreters and runtime environments, known as Java™ virtual machines (VMs), exist for most operating systems, including UNIX, the Macintosh OS, and Windows. Bytecode can also be converted directly into machine language instructions by a just-in-time (JIT) compiler. Further description of the Java™ Language environment can be found in the technical, trade, and patent literature; see e.g., Gosling, J. et al., "The Java Language Environment: A White Paper", Sun Microsystems Computer Company, October 1995, the disclosure of which is hereby incorporated by reference. For additional information on the Java™ programming language (e.g., version 2), see e.g., "Java 2 SDK, Standard Edition Documentation, version 1.4.2", from Sun Microsystems, the disclosure of which is hereby incorporated by reference.

Metadata: Metadata refers generally to data that describes other data. For example, metadata may identify a particular object (or component), and other objects that that the particular object relies upon. Metadata may describe how and when and by whom a particular set of data was collected, and how the data is formatted.

Microsoft® NET: A Microsoft platform that incorporates applications and a suite of tools and services.

Microsoft® .NET Framework: A collection of classes implemented on top of a CLR (Common Language Runtime) system providing containers, strings, components, interfaces, streams, and user interface control classes for use by programmers writing applications to run in the .NET execution environment (the .NET platform).

Packages: Refers to a collection of development modules, such as Java packages (e.g., .jar files) or C# packages (e.g., files from .NET framework).

Reflection: This is a feature of attribute-based programming that allows an application to query its own meta data. Reflection allows an application to discover information about itself so that it may display this information to the user, modify its own behavior by using late-binding and dynamic invocation (i.e., binding to and calling methods at run time), or create new data types at run time. In Java, for example, a Java Reflection API is provided that enables Java code to discover information about the fields, methods, and constructors of loaded (in-memory) classes, and to use reflected fields, methods, and constructors to operate on their underlying counterparts on objects, within security restrictions. The Java Reflection API accommodates applications that need access to either the public members of a target object (based on its run-time class) or the members declared by a given class.

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
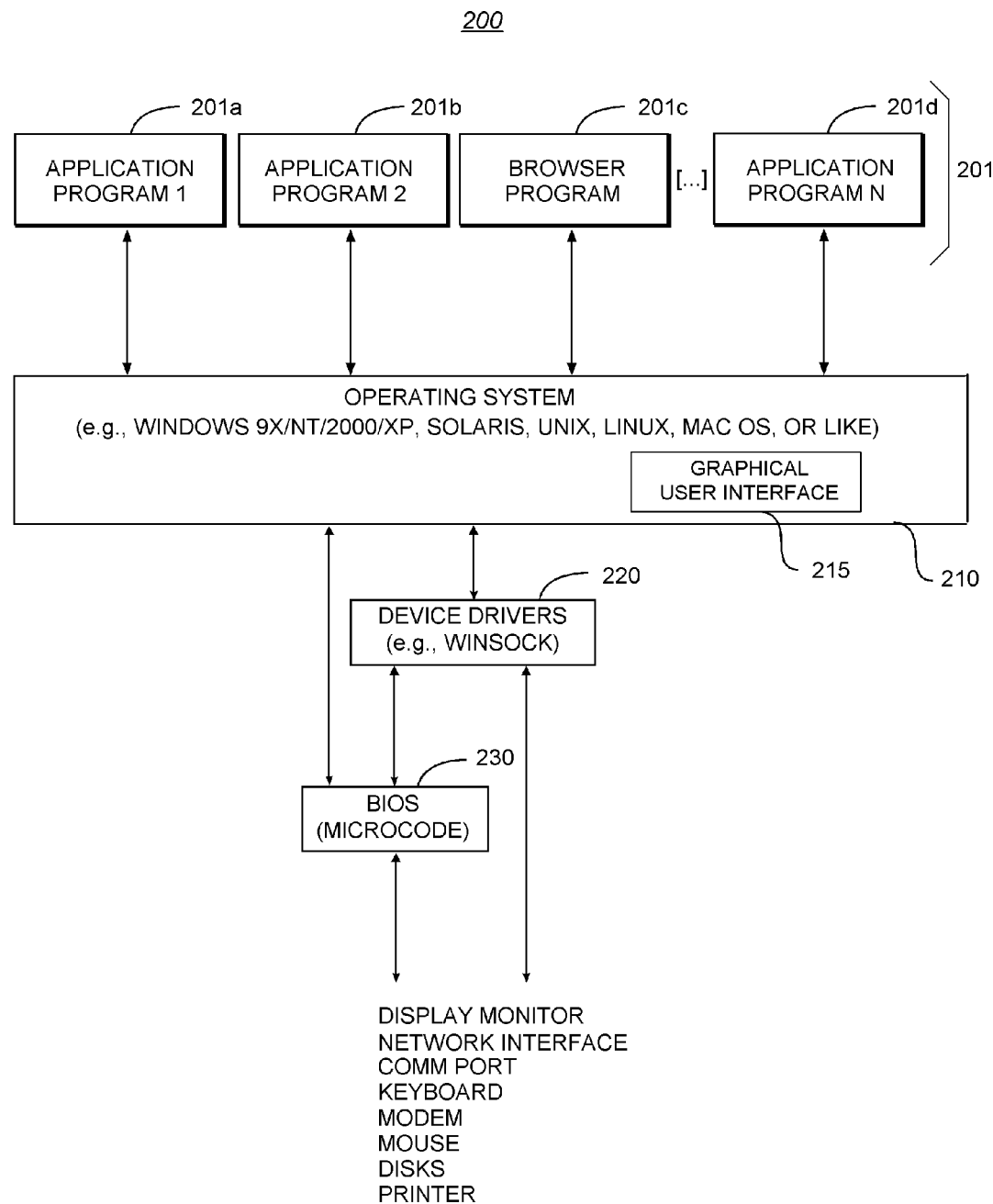
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Java Development Environment

Java is a simple, object-oriented language which supports multi-thread processing and garbage collection. Although the language is based on C++, a superset of C, it is much simpler. More importantly, Java programs are "compiled" into a binary format that can be executed on many different platforms without recompilation. A typical Java system comprises the following set of interrelated technologies: a language specification; a compiler for the Java language that produces bytecodes from an abstract, stack-oriented machine; a virtual machine (VM) program that interprets the bytecodes at runtime; a set of class libraries; a runtime environment that includes bytecode verification, multi-threading, and garbage collection; supporting development tools, such as a bytecode disassembler; and a browser (e.g., Sun's "Hot Java" browser).

Figure 3A:
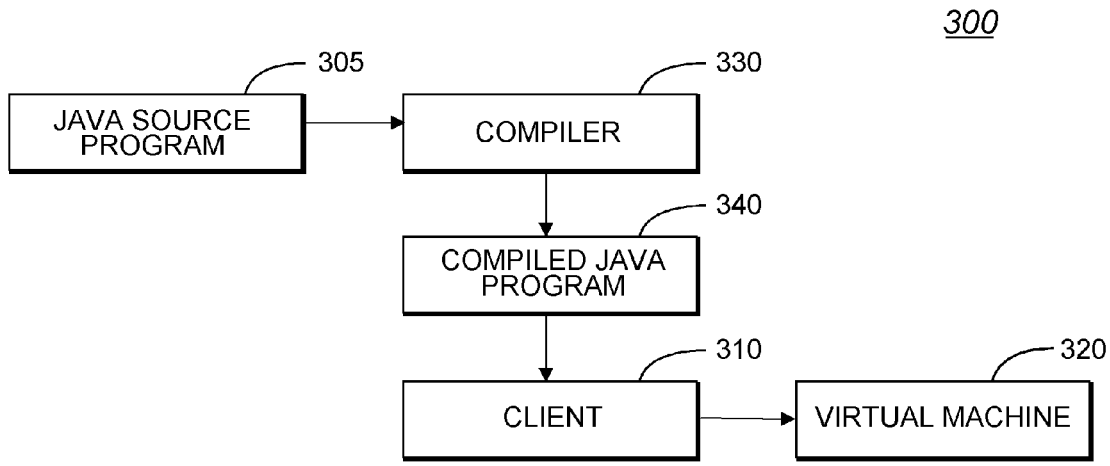
FIG. 3A is a block diagram illustrating a Java development system suitable for implementing the present invention, which includes a client which employs a virtual machine for executing programs.

FIG. 3A is a block diagram illustrating a Java development system 300 suitable for implementing the present invention, which includes a client 310 which employs a virtual machine 320 for executing programs. In particular, the client 310 executes a "compiled" (i.e., bytecode or pseudo-compiled) Java program 340, which has been created by compiling a Java source code program or script 305 with a Java compiler 330. Here, the Java source code program 305 is an application program written in the Java programming language; the pseudo-compiled Java program gram 340, on the other hand, comprises the bytecode emitted by the compiler 330. The virtual machine 320 includes a runtime interpreter for interpreting the Java bytecode program 340. During operation, the client 310 simply requests the virtual machine 320 to execute a particular Java compiled program.

Figure 3B:
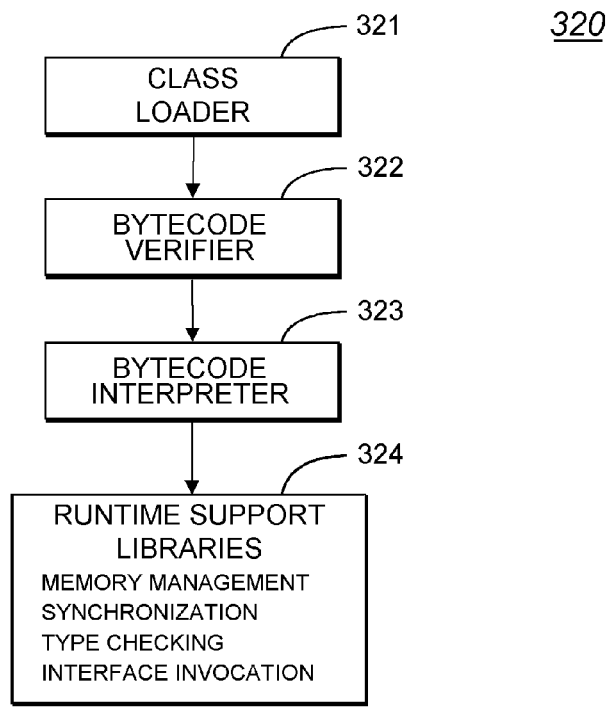
FIG. 3B is a block diagram illustrating the Java virtual machine of FIG. 3A in further detail.

FIG. 3B is a block diagram illustrating the Java virtual machine of FIG. 3A in further detail. As shown in FIG. 3B, the virtual machine 320 comprises a class loader 321, a bytecode verifier 322, a bytecode interpreter 323, and runtime support libraries 324. The class loader 321 is responsible for unpacking the class file which has been requested by a client. Specifically, the class loader 321 will unpack different sections of a file and instantiate in-memory corresponding data structures. The class loader will invoke itself recursively for loading any superclasses of the current class which is being unpacked.

The bytecode verifier 322 verifies the bytecode as follows. First, it checks whether the class has the correct access level. Since the class will access other classes for invoking their methods, the bytecode verifier 322 must confirm that appropriate access is in place. Additionally, the bytecode verifier confirms that the bytecode which comprises the methods is not itself corrupt. In this regard, the bytecode verifier confirms that the bytecode does not change the state of the virtual machine (e.g., by manipulating pointers).

Once the bytecode has been verified, a "class initializer" method is executed. It serves, in effect, as a constructor for the class. The initializer is not a constructor in the sense that it is used to construct an instance of a class—an object. The class initializer, in contrast, initializes the static variables of the class. These static variables comprise the variables which are present only once (i.e., only one instance), for all objects of the class.

Runtime support libraries 324 comprise functions (typically, written in C) which provide runtime support to the virtual machine, including memory management, synchronization, type checking, and interface invocation. At the client machine on which a Java application is to be executed, runtime support libraries 324 are included as part of the virtual machine; the libraries are not included as part of the Java application. The bytecode which is executed repeatedly calls into the runtime support libraries 324 for invoking various Java runtime functions.

The above-described computer hardware and software are presented for purposes of illustrating the basic underlying hardware and software components that may be employed for implementing the present invention. For purposes of discussion, the following description will present examples in which it will be assumed that there exists at least one computer system (whether desktop or server) for operating the computer-implemented methods described below. The present invention, however, is not limited to any particular environment or markup configuration. In particular, a Java language embodiment is not required, as the present invention may be embodied using other programming languages, such as C++, C#, or the like. The present invention may be implemented in any type of system architecture or processing environment capable of supporting the system and methodologies of the present invention presented in detail below.

Overview of Attribute-Based Component Programming System and Methodology

The present invention comprises an attribute-based component programming system and methodology for object-oriented languages. The system and methodology of the present invention provides a technique that is based on attributes, which are easier to understand and use than the "aspects" utilized in aspect-oriented programming (AOP). In contrast to prior techniques which are generally inflexible, the present invention provides that attributes can be defined internally or externally to the application source code, or using a combination of both internal and external definitions. Externally defined attributes ("dynamic attributes") are derived from properties in a configuration repository. Properties are defined by simple sets of name-value pairs, which are easier to understand and use than XML deployment descriptors and aspect definition syntaxes.

The system and methodology of the present invention also supports user-defined attributes, including both code generation and runtime metadata access for user-defined declarative behaviors. Prior techniques are generally inflexible in this regard and typically offer only one option (or none). The system of the present invention also supports both static and dynamic code generation, or a combination of both. Static generation allows fast application start up times, whereas dynamic generation allows for reconfiguration. Prior techniques are also generally inflexible in this regard, offering only one option.

The present invention also supports dynamic reconfiguration (adding new declarative behaviors) while also providing good performance and without needing access to the application source code. Prior techniques using dynamic proxies or request interceptors support dynamic reconfiguration, but generally do not perform as well due to repeated run-time analysis of metadata. In addition, the present invention avoids a number of the drawbacks that are typically experienced with load time code modification, such as complicated debugging due to lack of source code for the modified instruction codes.

The methodology of the present invention includes the use of a "hidden factory" pattern, which is as easy to use (from callers) as direct class-level calls. This contrasts with several prior techniques that require callers to deal explicitly with factory objects. Additionally, the methodology of the present invention is applicable to building fine-grained components. This is in contrast to several prior techniques which are so cumbersome that they are impractical to use except with coarse-grained components.

In addition, the components constructed in accordance with the methodology of the present invention are self-registering. The first time a component is activated, it registers itself with a repository. The repository can be queried later and it will reveal all components that are currently active, as well as those which have been previously active. Components can be defined with "abstract" classes. Thus, attributes can be used to generate all of the non-procedural code in a component. Components can also be defined with "abstract" methods enabling attributes to be used to generate all of the non-procedural code in a method.

The present invention is particularly useful for providing an implementation framework for building high performance, small footprint implementations of various standard Java APIs (e.g., EJB, JMS). This present invention also creates a powerful unit testing framework, using attributes to build programmable "mock objects". Additionally, it provides for a general-purpose productivity enhancing tool for object-oriented programmers. The components of the currently preferred embodiment of the system of the present invention will next be described.

System Components

The present invention works with and may be implemented using a variety of existing compilers and development systems. In a Java environment, the components utilized for implementation of the present invention include an integrated development environment (IDE) or other development tool or editor (e.g., a text editor), a (standard) Java compiler (JAVAC), a library containing classes implementing the methodology of the present invention, a dynamic Java component precompiler (DJC), and a runtime component compiler (RCC). Each of these components and their operations are described below.

A developer may choose to develop code and build dynamic Java components using a number of different tools or editors. These may include a variety of integrated development environment products or other development tools. Alternatively, the present invention operates in conjunction with text editors (e.g., TextPad) as well as more sophisticated development systems.

The library provides a number of additional classes that implement methodology of the present invention. When developing code in an IDE (or other development tool), a developer may create dynamic Java components using the system and methodology of the present invention by following a design pattern and using the classes provided in the library. For example, a developer that is writing a Java class in a text editor, can use the system and methodology of the present invention to create a dynamic Java component based on the class. A "Component" class included in the library allows a developer to create a component out of a given Java class and obtain instances of that component. As described below, the Component class includes functionality for generating a subclass of the original class and allows one to obtain instances of the subclass. The developer can then compile the resulting code/classes that are developed with a standard Java compiler in order to generate a compiled Java subclass that may contain additional behavior based on attributes (if any) defined by the developer.

In addition to the base "Component" class, an abstract "Attribute" class is also included in the library as a base class for a developer to implement attributes in order to add behavior to classes of a program that he or she is developing. A developer may, for instance, define attributes to perform logging or tracing which inherit from methods provided in the Attribute class. For example, the Attribute class includes an "overrides" method which provides a default implementation for one attribute to override another attribute. A developer implementing a new attribute may use this default override method that is provided in the Attribute class or may extend or modify the default approach in implementing the new attribute. In addition, the Attribute class includes a "getCompiler" method that enables an attribute to generate code for inclusion in a dynamically generated class (subclass) as hereinafter described. In this sense the present invention allows creation of metadata which is active. As an attribute can contain a compiler, it is not just passive data, but rather it may actively generate code (e.g., tracing code) for inclusion in a program. This is in contrast to prior systems (e.g., Microsoft NET), in which attributes are passive and only provide access to the data contained within the attribute.

In addition, an abstract "Attribute Compiler" class is also provided as a basis for implementing attribute compilers for dynamically generating code for inclusion in generated subclasses. Of particular interest, an attribute compiler also enables attributes to be applied to abstract methods. In this case, instead of adding behavior to an existing method, the attribute compiler can provide code for the body of a corresponding non-abstract method in the generated subclass. Examples of applying attributes to abstract methods are described below in this document. This is another feature which distinguishes the methodology of the present invention from prior aspect-oriented programming approaches. Using the present invention, one can implement a class including abstract methods and have the abstract methods completed (i.e., have code generated to implement the abstract methods) based on the attributes defined for the class. This is a powerful capability that is not found in prior art systems. The methodology of the present invention not only generates code to augment code that has already been implemented, but can also be used to actually generate code for implementing abstract methods or interfaces. The attribute compiler provides the ability to generate code for inclusion in various portions of a subclass that is generated when a component is instantiated as hereinafter described.

The present invention also makes available a dynamic Java precompiler that can be used in situations where one wants to generate components in advance rather than to dynamically generate components. One may, for instance, wish to do this to avoid the need to dynamically generate components each time an application starts up at runtime. By using the precompiler, the components may be generated in advance, thereby avoiding lengthy delays at the start up of a program (e.g., application program). In many circumstances it is useful to be able to reconfigure dynamically. However, it is not ideal if the ability to do so is at the expense of requiring everything to be generated dynamically (i.e., not being able to do anything in advance). The dynamic Java precompiler provides the ability to precompile, when necessary (e.g., to avoid slow start up with a program in a production environment).

The system of the present invention also includes a runtime component compiler. The runtime component compiler is currently implemented as a Component.getInstance( ) factory method and provides for generating a subclass based on an original class and attributes defined for a class when a component is instantiated as hereinafter described.

Figure 4:
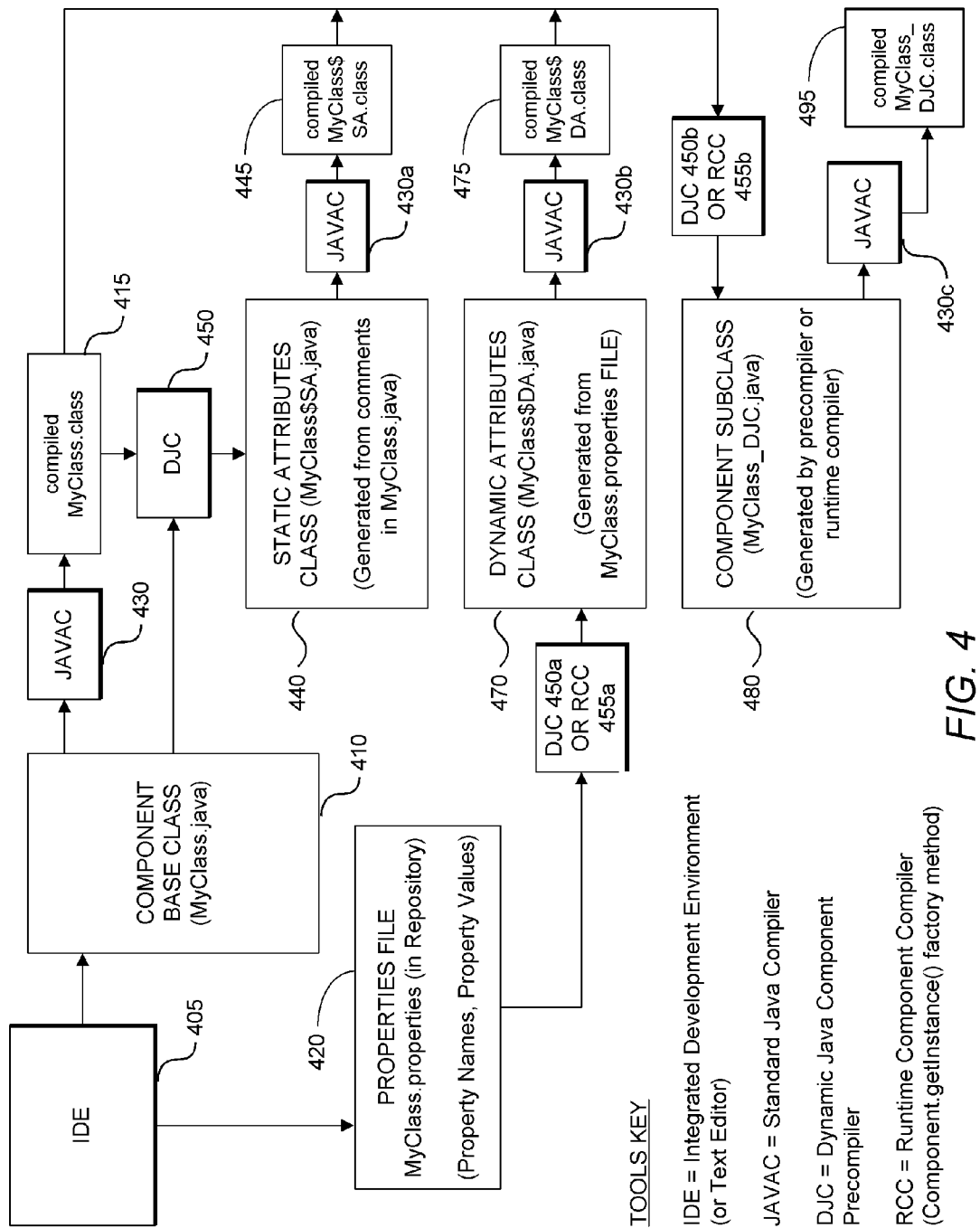
FIG. 4 is a flow diagram illustrating the process for generating dynamic Java components using the system and methodology of the present invention.

FIG. 4 is a flow diagram illustrating the process for generating dynamic Java components using the system and methodology of the present invention. As shown, a developer may start with a component base class (MyClass.java) 410 that is being developed in an integrated development environment (IDE) 405. As noted at FIG. 4, the IDE 405 may comprise a text editor or another type of development tool. The developer may create dynamic Java components based on the component base class (MyClass.java) 410 in one of several ways.

As shown at FIG. 4, the developer may include attributes as comments in the MyClass.java code 410. Using the dynamic Java component precompiler (DJC) 450, a static attributes class 440 may be generated based on comments in the MyClass.java base class 410. When compiled with the standard Java complier (JAVAC) 430a, a compiled MyClass$SA.class 445 is created based upon the attributes defined in the source code of the base class. When compiled with the base class (MyClass.java) 410 using the dynamic Java component precompiler (DJC) 450b or runtime component compiler (RCC) 455b, a component subclass (MyClass_DJC.java) 480 is generated by the DJC 450b or RCC 455b as shown at FIG. 4. When compiled using the standard Java compiler (JAVAC) 430c, a compiled MyClass_DJC.class 495 is generated which includes the functions provided by the developer in the base class (i.e., MyClass.java 410) and additional behavior which is generated by the system and methodology of the present invention based on the attributes defined for the class and included in comments in the source code.

A developer may also define attributes externally to the source code. For example, as also shown at FIG. 4, a developer/user may define attributes in a properties file (MyClass.properties) 420. The properties are typically stored in a repository as a set of property name and property value pairs. Using the DJC (dynamic Java component precompiler) 450a or the RCC (runtime component compiler) 455a, a dynamic attributes class 470 is generated based on the properties file (i.e., the MyClass.properties file 420). When compiled using the standard JAVAC 430b, a MyClass$DA.class file 475 is generated based on the dynamic attributes class 470. As with the static attributes class, a component subclass (MyClass_DJC.java) 480 is generated based on the compiled MyClass$DA.class 475 and the compiled MyClass.class 415. The component subclass 480 that is generated includes the additional behavior which is generated by the system and methodology of the present invention based on the attributes defined for the class and included in the external properties file 420. As shown, with this approach, access to the underlying source code of the component base class (MyClass.java) 410 is not required in order to add behavior to the class. The present invention enables the developer/user to define attributes external to the class for adding behavior to the class. This is particularly useful in a case in which a program (e.g., application) is in a production environment and the source code is unavailable. The operations of the present invention will next be described in greater detail.

Detailed Operation

Figure 5:
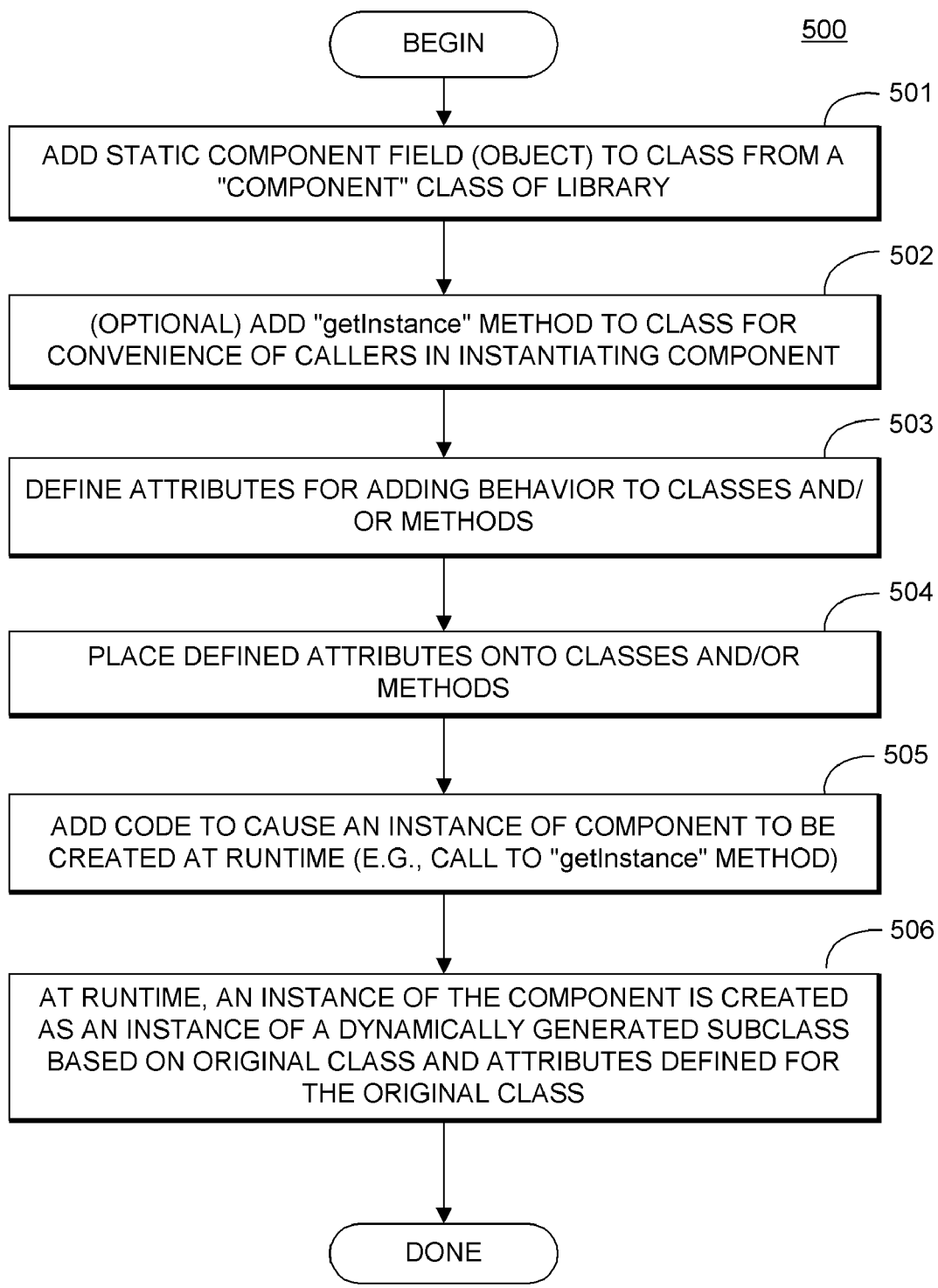
FIG. 5 is a flowchart illustrating at a high level the methods of operation of the present invention in defining attributes and creating dynamic components.

FIG. 5 is a flowchart 500 illustrating at a high level the methods of operation of the present invention in defining attributes and creating dynamic components. The following discussion illustrates the operations of the present invention by describing a simple example illustrating how a component may be created from a Java class of a program and how attributes may be defined so that additional code is generated providing additional behavior when the program is executed at runtime. This example is for purposes of illustrating the operations of the present invention and not for limitation. The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Initially, a user (e.g., application developer) is editing source code of a program in a development system. The development system can be an integrated development environment (IDE) or a simple text or code editor. The developer may, for instance, be writing a program in the Java programming language. More particularly, a developer/user writing a particular Java class (e.g., a class named "MyClass.java") may wish to add additional behavior to the class using the attribute-based component programming system and methodology of the present invention. For instance, the developer may wish to define attributes which specify declaratively the addition of method tracing behavior to the class being developed in order to assist in debugging the program that is being developed.

At step 501, a developer/user may provide for creating a component from the class he or she is developing (e.g., a plain Java class named "MyClass") by the addition to the class of a static component field (or object) from a "Component" class. The Component class is a component of the above-described library and comprises a main workhorse routine implementing the methodology of the present invention. For example, a static field named "component" may be added to the class as illustrated in the example described below in this document.

After the static component field has been added to the class, a "getInstance" method is also added to the class at optional step 502. The getInstance method is not required, but is added for the convenience of callers. Adding the getInstance method to the class enables callers to more easily obtain/create an instance of the component (e.g., the "component" field or object in this example). A component could instead be directly created, but adding the getInstance method makes the process easier and also reduces the chance of error.

After adding the above code into the class to provide for creating a component, the developer may then proceed to define attributes and place attributes onto the classes and/or onto the methods of the program in such a way that the instance of the component that is generated, when the component is instantiated, has some additional behavior that is determined by those attributes. In other words, a developer can add attributes to components in order to obtain extra behavior determined by those attributes when the components are generated. At step 503, the developer/user defines attributes for adding behavior to classes or methods of a program. For example, a developer may define (or may have previously defined) attributes for adding tracing behavior to methods of a program. This tracing behavior may, for instance, cause a message to be displayed on the screen indicating that a particular method was called, specifying the calling parameters with which the method was called, and providing the result returned by the method. As described below, the attributes may be defined in several ways. The attributes may, for instance, be defined in comments included in the code. Attributes may also be defined in an external properties file as hereinafter described. The attributes may also be directly included in the class. In this manner the attributes may be defined within the class or outside of the class including the component. The ability to define attributes external to the class also enables a developer/user to add behavior to an application when the application is deployed in compiled form and its source code is no longer available.

After attributes have been defined, at step 504, the defined attributes are placed onto the classes and methods of the program. For example, a developer may add the above-described tracing attributes to an "add" method of a given class, so that when the "add" method is called, the defined attribute causes the above-described tracing behavior to be added to this method. Attributes that are defined and added to a class or method generally result in additional code being automatically generated to implement the additional behavior (e.g., method tracing behavior) when the method is called at runtime as described below in this document.

Next, at step 505, the developer adds appropriate code into his or her program to cause an instance of the component to be created at runtime. For example, an instance of the component may be created by calling the "getInstance" method of the class added at step 502. At runtime, when a caller instantiates a component, an instance of the component is created as an instance of a dynamically generated subclass at step 506. This subclass is automatically generated, compiled, and loaded by the call to "component.getInstance( )". (Alternatively, the subclass may be generated using a dynamic Java component precompiler as previously described). The generation of the component subclass, its compilation, and creation of instances of the component is handled by the Component object. The system and methodology of the present invention includes functionality for generating the subclass based on the original class and the attributes (if any) defined for the class. The attributes added to the class typically result in the generation of extra code that is added into the dynamically generated subclasses. The Component class generates the subclass (i.e., creates the shell) for each of the components (i.e., component objects) that are instantiated. For each of the component objects in the class, the Component class essentially asks the attributes to specify the extra code that is to be inserted into the appropriate methods of the class. The attributes thereby have an opportunity to add code into the various methods of the original class.

When a new instance of a component is created, one is really obtaining an instance of a subclass of the original class which includes the extra behavior added through the definition and placement of attributes onto the class. Rather than creating a new instance of the original class, a subclass with the additional code is dynamically generated. In other words, the result of the above steps is that at runtime a subclass of the original class is generated with the "extra" behavior (e.g., tracing in this example) added. The extra behavior that is added into this subclass is defined by the attributes and may override and/or extend methods of the original class.

It should be noted that in some cases component fields may be included in a class, but without associating any attributes associated with the class. In this case, a subclass is still generated; however, the subclass that is generated would have no extra code. If no attributes are associated with the class, the subclass that is generated will be essentially equivalent in functionality to the original class (i.e., no extra behavior).

This feature of the present invention is useful in conjunction with adding tracing to a program that is being developed. The present invention can simplify the otherwise tedious and potentially error-prone process of adding tracing code into classes during development in order to identify errors in the program. For example, a complex program may have a total of 500 classes. Adding tracing code into all of these classes would be inefficient and may also cause errors to be introduced into the program. In prior art systems, the tracing code generally must be removed when a developer is finished with the development process and ready to roll the program into a production environment. Alternatively, the developer would need to remove the tracing code by including conditional statements providing for signaling the activation/deactivation of the tracing code (e.g., if tracing is to be performed, then perform the tracing; otherwise, do nothing). The developer is faced with the choice between the tedious task of commenting out or removing the tracing code or, alternatively, adding additional code to enable the program to determine at runtime that it should no longer be performing any tracing. In contrast, the present invention provides that a method tracing attribute may be added to a class during development to determine how the program is operating as calls to various methods of the program are made. However, once the program is working and before the program is rolled into production, the tracing attribute may simply be removed. The system and methodology of the present invention enables this to be done simply and in a manner which reduces the risk of errors.

It should also be noted that aspect oriented programming (AOP) can also provide this kind of benefit of being able to add extra behavior to a program. However, the way that this extra behavior is defined and added is very different if an aspect oriented approach is utilized. One advantage of the approach of the present invention is that it provides good performance (e.g., one can define attributes that generate very tight, optimized code). The attributes of the present invention are also generally easier to understand and use than the "aspects" of AOP. The attribute-oriented approach of the present invention is also very flexible in that it enables very specialized code to be generated that is specific to the classes and methods that are being called as the program is executing at runtime.

The following describes how a developer/user can create and use components and define attributes in order to utilize the system and methodology of the present invention. This includes discussion of each of the steps described above in more detail, including how components are created and instances of components obtained. Both creation and instantiation of components involve using functionality provided by the system of the present invention. In addition, how one can define and use attributes is also described. The following discussion includes some examples describing how attributes can be placed onto classes and methods in order to use them, as well as examples illustrating the definition of attributes. In many cases, attributes are included in the class out of which one is making the component. However, attributes can also be defined in, and generated from, an external file (e.g., a properties file). In either case, the result of defining attributes and adding components to classes is a dynamically generated subclass that is either generated at runtime or precompiled, as desired. The dynamically generated subclass typically adds additional behavior to the original class, such as adding extra methods or extra fields to the original class. The subclass can also override a method that was already present in the original class, such as by adding some additional tracing code before and after a particular method, for instance.

Just-In-Time Components

The following discussion describes the implementation framework and intended usage of dynamic Java components constructed in accordance with the teachings of the present invention. A component is created from a plain Java class. For example, the following Java class named "MyClass" can be made into a component:

```
1:    public class MyClass
2:    {
3:        public int add(int x, int y)
4:        {
5:            return x + y;
6:        }
7:    }
```

As shown, the above class includes a very simple "add" method for adding two integer numbers and returning the result.

To make a class into a component requires the addition to the class of a static field named "component" as illustrated below.

```
1:    public class MyClass
2:    {
3:        public static final Component component = new Component(MyClass.class);
```

```
4:
5:        public static MyClass getInstance( )
6:        {
7:            return (MyClass)component.getInstance( );
8:        }
9:
10:       public int add(int x, int y)
11:       {
12:           return x + y;
13:       }
14:   }
```

As shown above, a Component object named "component" is created at line 3. For the convenience of callers, a static method named "getInstance" is also added as provided above at lines 5-8. The static "getInstance" method enables instances of the component to be created more easily.

A caller may now instantiate the component (create an instance) by calling the static "getInstance" method of the "MyClass" class as follows:

1: MyClass myobject=MyClass.getInstance( );
2: int z=myObject.add(1, 2);

Alternatively, since the static "MyClass.getInstance" method is not required, the caller could directly use the component field as follows:

1: MyClass myObject=(MyClass)MyClass.component.getInstance( );
2: int z=myObject.add(1, 2);

As directly using the component field is more cumbersome and error-prone, it is recommended that the static "getInstance" method be used.

Dynamic Subclasses

When a caller instantiates a component, the class of the instance it obtains is a subclass of the declared component class. With the class "MyClass" defined as illustrated above, the following code fragment:

1: MyClass myObject=new MyClass( );
2: System.out.println("class="+myObject.getClass( ).getName( ));

would causing the printing of the following:

1: class=MyClass

However, the below code fragment:

1: MyClass myObject=MyClass.getInstance( );
2: System.out.println("class="+myObject.getClass( ).getName( ));

results in the printing of the following:

1: class=MyClass_DJC

In the latter case, the object is an instance of a dynamically generated subclass "MyClass_DJC". This subclass is generated, compiled, and loaded by the first call to "component.getInstance( )". Subsequent calls to "component.getInstance( )" will return new component instances without regeneration, recompilation, or reloading of the subclass. If the class "MyClass" is loaded again (within the running process) by another class loader, the dynamic subclass generation process will be repeated. The above approach provides for dynamically generating, compiling, loading, and creating an instance of a declared component class.

Abstract Classes

If direct instantiation of a component classes is permitted, it allows for the mistake of obtaining an instance of the base class. Any additional behaviors that might be provided by the component subclass will not be available. It is therefore recommended, but not required, that a component class be declared as "abstract" as illustrated in the following class:

```
1:      public abstract class MyClass
2:      {
3:          public static final Component component = new
Component(MyClass.class);
4:
5:          public static MyClass getInstance( )
6:          {
7:              return (MyClass)component.getInstance( );
8:          }
9:
10:         public int add(int x, int y)
11:         {
12:             return x + y;
13:         }
14:     }
```

By declaring this class as abstract, it is certain that all callers correctly use the "getInstance method" to obtain an instance, since direct instantiation of an abstract class will not be permitted by the Java compiler. For example, the compiler will report an error if the following call is made to the above abstract class:

1: //compiler will report an error
2: MyClass myobject=new MyClass( );

Attributes

A component class may include attributes which specify declaratively that some additional behavior should be made available by the generated component subclass. For example, method tracing behavior could be enabled using an attribute as follows:

```
1:      public abstract class MyClass
2:      {
3:          public static final Attribute[] attributes =
4:          {
5:              ComponentAttributes.TracePublicMethods(MyClass.class)
6:          };
7:
8:          public static final Component component = new
Component(MyClass.class);
9:
10:         public static MyClass getInstance( )
11:         {
12:             return (MyClass)component.getInstance( );
13:         }
14:
15:         public int add(int x, int y)
16:         {
17:             return x + y;
18:         }
19:     }
```

The "ComponentAttributes.TracePublicMethods(MyClass.class)" expression at line 5 constructs an instance of TraceAttribute. Alternatively, an attribute can be specified for a particular field or method as illustrated below:

```
1:      public abstract class MyClass
2:      {
3:          public static final Attribute[] attributes =
4:          {
5:              ComponentAttributes.TraceMethod("add(int x, int y)")
6:          };
7:
8:          public static final Component component = new
Component(MyClass.class);
9:
10:         public static MyClass getInstance( )
11:         {
12:             return (MyClass)component.getInstance( );
13:         }
14:
15:         public int add(int x, int y)
16:         {
17:             return x + y;
18:         }
19:
20:         public int subtract(int x, int y)
21:         {
22:             return x - y;
23:         }
24:     }
```

When the "component.getInstance( )" method is first called, it calls "TraceAttribute.getAttributeCompiler( )", to see if the TraceAttribute contains an attribute compiler (mini code generator) that wishes to generate any additional code for the attribute. If so, the additional code is added into the generated subclass at the appropriate places. This will result in generation of a subclass such as the following:

```
1:      public class MyClass_DJC
2:          extends MyClass
3:      {
4:          public MyClass_DJC( )
5:          {
6:          }
7:
8:          public int add(final int p1, final int p2)
9:          {
10:             int $djc_result;
11:             try
12:             {
13:                 com.sybase.djc.log.TraceLog.enter("MyClass.add",
new java.lang.Object[ ] {new java.lang.Integer(p1), new java.lang.Integer(p2)});
14:                 com.sybase.djc.log.TraceLog.setIndent(+2);
15:                 try
16:                 {
17:                     $djc_result = super.add(p1, p2);
18:                 }
19:                 finally
20:                 {
21:                     com.sybase.djc.log.TraceLog.setIndent(-2);
22:                 }
23:             }
24:             catch (java.lang.Exception $ex_1)
25:             {
26: com.sybase.djc.log.TraceLog.exitWithRuntimeException("MyClass.add",
(java.lang.RuntimeException)$ex_1);
27:                 throw (java.lang.RuntimeException)$ex_1;
28:             }
29:             catch (java.lang.Error $ex_2)
30:             {
31: com.Sybase.djc.log.TraceLog.exitWithError("MyClass.add",
$ex_2);
32:                 throw $ex_2;
33:             }
34:             com.sybase.djc.log.TraceLog.exitWithResult
("MyClass.add", new java.lang.Integer($djc_result));
35:             return $djc_result;
36:         }
37:     }
```

As illustrated above at line 17 of the generated subclass, the above "MyClass_DJC" subclass calls the "add" method of the original class ("super.add (p1, p2)"). The additional code at lines 10-16 prior to this call to the add method of the original class (superclass) and the additional code after line 17 is added based on the attributes that have been defined for the original class. These defined attributes cause this additional code to be generated for tracing errors that may occur with this call to the add method, thereby enabling a developer to identify errors in this particular method (e.g., during the development process). The creation of an attribute which causes the generation of this additional code is described below.

Attributes are themselves defined as classes. An attribute class is more than just a container for metadata, as it may optionally provide access to an attribute compiler. Thus, attributes can be considered as active metadata, as opposed to the passive metadata which is typically used by prior art approaches. For example, a tracing attribute could be defined as:

```
1:   public class TraceAttribute extends Attribute
2:   {
3:       private int _methods = 0;
4:
5:       public TraceAttribute(Class _class)
6:       {
7:           _methods = Component.AllMethods;
8:           setClass(_class);
9:       }
10:
11:      public TraceAttribute(String methodSignature)
12:      {
13:          _methods = Component.AllMethods;
14:          setMethodSignature(methodSignature);
15:      }
16:
17:      public boolean overrides(Attribute thatAttribute)
18:      {
19:          if (! (thatAttribute instanceof TraceAttribute))
20:          {
21:              return false;
22:          }
23:          TraceAttribute that = (TraceAttribute)thatAttribute;
24:          if (this.getMethodName( ) != null)
25:          {
26:              return that.getMethodName( ) != null
27:                      &&
this.getMethodName( ).equals(that.getMethodName( ));
28:          }
29:          else
30:          {
31:              return this.getDeclaringClass( ) ==
that.getDeclaringClass( )
32:                      && this._methods == that._methods;
33:          }
34:      }
35:
36:      public TraceAttribute methods(int methods)
37:      {
38:          if (methods < Component.ObjectMethods || m
ethods >
Component.PublicMethods)
39:          {
40:              throw new IllegalArgumentException("meth
ods = " +
methods);
41:          }
42:          _methods = methods;
43:          return this;
44:      }
45:
46:      public String toString( )
47:      {
48:          if (getMethodName( ) != null)
49:          {
50:              return "TraceMethod(\"" + getMethodSignat
ure( )
+ "\")";
51:          }
52:          else
53:          {
54:              return "Trace" + Component.showMethods(
_methods)
+ "()";
55:          }
56:      }
57:
58:      public AttributeCompiler getCompiler( )
59:      {
60:          return new AttributeCompiler( )
61:          {
62:              public void beforeSuperCall(Component co
mponent,
Method method, MethodWriter mw)
63:              {
64:                  if (! component.match(method, _methods
))
65:                  {
66:                      return;
67:                  }
68:                  mw.beginTry( );
69:                  mw.call("com.sybase.djc.log.TraceLog.ent
er",
70:
mw.string(component.getBaseClass( ).getName( ) + "." +
method.getName( )),
71:                              mw.getParameterList( ).getObjectArr
ay( ));
72:                  mw.call
("com.sybase.djc.log.TraceLog.setIndent", "+2");
73:                  mw.beginTry( );
74:              }
75:
76:              public void afterSuperCall(Component comp
onent,
Method method, MethodWriter mw)
77:              {
78:                  if (! component.match(method, _methods
))
79:                  {
80:                      return;
81:                  }
82:                  mw.finallyBlock( );
83:                  mw.call("com.sybase.djc.log.TraceLog.set
Indent",
"-2");
84:                  mw.endTry( );
85:                  LocalVariable ex = mw.catchException( );
86:                  for (Iterator i =
mw.getExceptionList( ).iterator( ); i.hasNext( );)
87:                  {
88:                      String exType = (String)i.next( );
89:                      mw.beginIf(ex + " instanceof " + exTy
pe);
90:                      traceCatch(method, mw, exType,
ex.toString( ), "Exception");
91:                      mw.endIf( );
92:                  }
93:                  traceCatch(method, mw,
"java.lang.RuntimeException",
94:                              mw.cast(RuntimeException.class,
ex),
"RuntimeException");
95:                  ex = mw.catchError( );
96:                  traceCatch(method, mw, "java.lang.Error",
ex.toString( ), "Error");
97:                  mw.endTry( );
98:                  if (method.getReturnType( ) == void.class
)
99:                  {
100:                     mw.call("com.sybase.djc.log.TraceLog
.exit",
101:
mw.string(component.getBaseClass( ).getName( ) + "." +
method.getName( )));
102:                 }
103:                 else
104:                 {
```

```
105:             mw.call("com.sybase.djc.log.TraceLog.exitWithResult",
106:                 mw.string(component.getBaseClass( ).getName( ) + "." +
method.getName( )),
107:                                 mw.wrapResult( ));
108:             }
109:         }
110:
111:         private void traceCatch(Method method,
MethodWriter mw, String exType, String ex, String kind)
112:         {
113:             mw.call("com.sybase.djc.log.TraceLog.exitWith"
+ kind,
114:                 mw.string(method.getDeclaringClass( ).getName( ) + "." +
mw.getName( )),
115:                                 ex);
116:             if (kind.equals("Error"))
117:             {
118:                 mw.throwError(ex);
119:             }
120:             else if (kind.equals("RuntimeException"))
121:             {
122:                 mw.throwRuntimeException(ex);
123:             }
124:             else
125:             {
126:                 mw.throwException(exType, ex);
127:             }
128:         }
129:
130:         private String showParameters(MethodWriter mw)
131:         {
132:             StringBuffer show = new StringBuffer( );
133:             int comma = 0;
134:             for (Iterator i =
mw.getParameterList( ).iterator( ); i.hasNext( ); comma++)
135:             {
136:                 MethodParameter mp =
(MethodParameter)i.next( );
137:                 if (comma > 0)
138:                 {
139:                     show.append(" + ");
140:                     show.append(mw.string(","));
141:                 }
142:                 show.append(" + ");
143:                 show.append(mp.name);
144:             }
145:             return show.toString( );
146:         }
147:
148:         private String showResult(Method method,
MethodWriter mw)
149:         {
150:             if (method.getReturnType( ) == Void.TYPE)
151:             {
152:                 return "";
153:             }
154:             else
155:             {
156:                 return " + " + mw.string(" = ") + " + "
+ mw.getResult( );
157:             }
158:         }
159:     };
160:     }
161: }
```

The above methodology for defining active metadata provides an extensible mechanism for static and/or dynamic generation of procedural code from declarative attributes. It should be noted that although in its presently preferred embodiment the code generator for an attribute is usually embedded as an "inner class" within the attribute class, this is not essential to the proper functioning of the methodology of the present invention. Any case in which there is a defined one-to-one correspondence between an attribute instance and an attribute compiler (code generator) instance should be considered equivalent.

Abstract Methods

Attributes can be applied to abstract methods. In this case, instead of adding behavior to an existing method, the attribute compiler can provide code for the body of a corresponding non-abstract method in the generated subclass.

```
1:  public abstract class MyClass
2:  {
3:      public static final Attribute[ ] attributes =
4:      {
5:          ComponentAttributes.LogMethod("errorDivideByZero(int x)")
6:              .message("Oops, you tried to divide ${x} by zero!")
7:      };
8:
9:      public static final Component component = new Component(MyClass.class);
10:
11:     public static MyClass getInstance( )
12:     {
13:         return (MyClass)component.getInstance( );
14:     }
15:
16:     public int divide(int x, int y)
17:     {
18:         if (y == 0)
19:         {
20:             throw new RuntimeException(errorDivideByZero(x));
21:         }
22:         return x / y;
23:     }
24:
25:     public abstract String errorDivideByZero(int x);
26: }
```

The attribute used in the above example could be defined as:

```
1:  public class LogMethodAttribute extends Attribute
2:  {
3:      private static final String LOG = "$djc_log";
4:
5:      private static final String[ ] LOG_LEVEL = { "?", "Debug", "Info", "Warn", "Error", "Fatal" };
6:
7:      private static final String EXPECTED_RETURN_TYPE = "void or java.lang.String";
8:
9:      private int _logLevel;
10:     private String _messageFormat;
11:     private FormatMethodAttribute _formatAttribute;
12:
13:     public LogMethodAttribute(String methodSignature)
14:     {
15:         setMethodSignature(methodSignature);
16:         if (methodSignature.startsWith("debug"))
17:         {
18:             _logLevel = LogLevel.DEBUG;
19:         }
20:         else if (methodSignature.startsWith("info"))
21:         {
22:             _logLevel = LogLevel.INFO;
```

-continued

```
 23:         }
 24:         else if (methodSignature.startsWith("warn"))
 25:         {
 26:             _logLevel = LogLevel.WARN;
 27:         }
 28:         else if (methodSignature.startsWith("error"))
 29:         {
 30:             _logLevel = LogLevel.ERROR;
 31:         }
 32:         else if (methodSignature.startsWith("fatal"))
 33:         {
 34:             _logLevel = LogLevel.FATAL;
 35:         }
 36:         else
 37:         {
 38:             throw new IllegalArgumentException("methodSignature
= " + methodSignature);
 39:         }
 40:         _formatAttribute = new FormatMethodAttribute("format_"
+ methodSignature);
 41:     }
 42:
 43:     public LogMethodAttribute message(String messageFormat)
 44:     {
 45:         if (messageFormat == null)
 46:         {
 47:             throw new NullPointerException("messageFormat");
 48:         }
 49:         _messageFormat = messageFormat;
 50:         _formatAttribute.format(messageFormat);
 51:         return this;
 52:     }
 53:
 54:     public String toString( )
 55:     {
 56:         return "LogMethod(\"" + getMethodSignature( )
+ "\").message(\"" + _messageFormat + "\")";
 57:     }
 58:
 59:     public int getLogLevel( )
 60:     {
 61:         return _logLevel;
 62:     }
 63:
 64:     public String getMessageFormat( )
 65:     {
 66:         return _messageFormat;
 67:     }
 68:
 69:     public AttributeCompiler getCompiler( )
 70:     {
 71:         if (_messageFormat == null)
 72:         {
 73:             return null;
 74:         }
 75:         return new AttributeCompiler( )
 76:         {
 77:             public void abstractBody(Component component,
Method method, MethodWriter mw)
 78:             {
 79:                 // Generate an extra formatting method (using
FormatAttribute)
 80:                 AttributeCompiler formatAC =
_formatAttribute.getCompiler( );
 81:                 String formatMethodName = "format_" +
method.getName( );
 82:                 MethodWriter format = mw.newMethod(method,
formatMethodName);
 83:                 format.setReturnType(String.class);
 84:                 format.setParameterList(mw.getParameterList( ));
 85:                 format.beginMethod( );
 86:                 format.newResult( );
 87:                 // Delegate to FormatAttribute to generate body
of format method.
 88:                 // Note: FormatAttribute must accept 'null'
Method parameter as
 89:                 // the LogAttribute's method might have 'void'
return type, but
 90:                 // all format methods must return a String.
And since we can't
 91:                 // dynamically construct a Method object, we
pass null.
 92:                 formatAC.abstractBody(component, null, format);
 93:                 format.returnResult( );
 94:                 format.endMethod( );
 95:
 96:                 if (! mw.hasStaticField(LOG))
 97:                 {
 98:                     mw.newStaticField("com.sybase.djc.log.Logger", LOG,
 99:                         mw.invoke("com.sybase.djc.log.LogManager.getInstance( ).getLogger",
100:                             component.getBaseClass( ).getName( ) + ".class"));
101:                 }
102:
103:                 mw.notAbstract( );
104:                 String logMethod =
LOG_LEVEL[_logLevel].toLowerCase( );
105:                 Class returnType = method.getReturnType( );
106:                 if (returnType == void.class)
107:                 {
108:                     mw.beginIf(mw.invoke(LOG + "." + logMethod));
109:                     LocalVariable message =
mw.newLocalVariable(String.class, "message",
110:                         mw.invoke("this." + formatMethodName,
mw.getParameterList( )));
111:                     mw.call(LOG + "." + logMethod,
112:                         mw.string(method.getName( )),
113:                         message);
114:                     mw.endIf( );
115:                 }
116:                 else if (returnType == String.class)
117:                 {
118:                     LocalVariable message =
mw.newLocalVariable(String.class, "message",
119:                         mw.invoke("this." + formatMethodName,
mw.getParameterList( )));
120:                     mw.beginIf(mw.invoke(LOG + "." +
logMethod));
121:                     mw.call(LOG + "." + logMethod,
122:                         mw.string(method.getName( )),
123:                         message);
124:                     mw.endIf( );
125:                     mw.setResult(message);
126:                 }
127:                 else
128:                 {
129:                     component.errorExpectedReturnType(method,
EXPECTED_RETURN_TYPE, LogMethodAttribute.this);
130:                     mw.error("expected return type " +
EXPECTED_RETURN_TYPE);
131:                 }
132:             }
133:         };
134:     }
135: }
```

The above illustrates the methodology of the present invention for dynamically generating the body for an abstract method.

Generating Static Attributes from Comments

The syntax for specifying attributes using a static array initializer can be a little awkward, particularly for field and method-level attributes, where the name or signature of the field or method needs to be specified when constructing the attribute values. An alternative approach is to specify the attributes in class, field, or method-level comments. An example of this alternative approach is as follows:

```
 1:    public abstract class MyClass
 2:    {
 3:        public static final Component component = new Component(MyClass.class);
 4:
 5:        public static MyClass getInstance( )
 6:        {
 7:            return (MyClass)component.getInstance( );
 8:        }
 9:
10:        public int divide(int x, int y)
11:        {
12:            if(y == 0)
13:            {
14:                throw new RuntimeException(errorDivideByZero(x));
15:            }
16:            return x / y;
17:        }
18:
19:        /**
20:         ** @djc.LogMethod(message = "Oops, you tried to divide ${x} by zero!")
21:         **/
22:        public abstract String errorDivideByZero(int x);
23:    }
```

A source code processor reads the comments and generates the attributes in a separate class as illustrated by the following example:

```
1:    public class MyClass$SA
2:            extends com.sybase.djc.ComponentAttributes
3:        {
4:            public static final com.sybase.djc.Attribute[ ] attributes =
5:            {
6:                LogMethod("errorDivideByZero(int x)").message("Oops, you tried to divide ${x} by zero!"),
7:            };
8:        }
```

The attributes class can be generated and compiled dynamically, as long as source code is available when the component is instantiated. This is most useful during a project's development phase. In a production phase where source code is not available, the static attributes class must already have been generated and precompiled. This is achieved using a command-line preprocessing step.

A simple automated mapping is defined between the syntax of attributes in comments and the syntax in a static attributes class. The following examples will illustrate this mapping:

Class-level comment (e.g., for class MyClass): @djc.SomeAttribute(theValue), maps to: SomeAttribute( ).value(theValue).

Class-level comment (e.g., for class MyClass): @djc.SomeAttribute(name1=value1, name2=value2, . . . ), maps to: SomeAttribute( ).name1(value1).name2(value2) . . . .

Field-level comment (e.g., for field myField): @djc.SomeAttribute(theValue), maps to: SomeAttribute("myField").value(theValue).

Field-level comment (e.g., for field myField): @djc.SomeAttribute(name1=value1, name2=value2, . . . ), maps to: SomeAttribute("myField").name1(value1).name2(value2) . . . .

Method-level comment (e.g., for method myMethod(int x)): @djc.SomeAttribute(theValue), maps to: SomeAttribute("myMethod(int x)").value(theValue).

Method-level comment (e.g., for method myMethod(int x)): @djc.SomeAttribute(name1=value1, name2=value2, . . . ), maps to: SomeAttribute("myMethod(int x)").name1(value1).name2(value2) . . . .

The benefits of this simple mapping include that there is no need to implement a complex parser for attribute comment syntax, and that the static attribute processor does not need to be altered to accommodate new attributes that may be defined in the future. The methodology facilitates dynamically generating and compiling a class containing static attributes from comments in a component's source file. The methodology of the present invention also provides for loading the generated static attributes class before subclass generation when a component is instantiated. In addition, a simple automated mapping can be defined between attributed syntax in comments and attributed syntax as expressed in generated source code.

Generating Dynamic Attributes from Properties

Once an application is deployed in compiled form and its source code is no longer available, there may arise a need to add behaviors to the existing compiled code. This is achieved using dynamic attributes. Dynamic attributes are defined with property files in a configuration repository such as illustrated by the following example:

MyClass.properties
Property Name=@PermitAccess("divide(int x, int y))")
Property Value=SecurityRole="MathRole"

A property file processor reads the properties and generates the attributes in a separate class. The following is an example of the class generated based upon the above properties:

```
1:    public class MyClass$DA
2:            extends com.sybase.djc.ComponentAttributes
3:        {
4:            public static final com.sybase.djc.Attribute[ ] attributes =
5:            {
6:                PermitAccess("divide(int x, int y)").securityRole("MathRole"),
7:            };
8:        }
```

As with static attributes, a simple mapping is defined between the syntax of dynamic attributes and the syntax in a static attributes class as illustrated by the following examples:

Class-level property (e.g., for class MyClass). Property Name: @SomeAttribute, Property Value: value=theValue, maps to: SomeAttribute( ).value(theValue).

Class-level property (e.g., for class MyClass). Property Name: @SomeAttribute Property Value: name1=value1, name2=value2, maps to: SomeAttribute( ).name1(value1).name2(value2) . . . .

Field-level property (e.g., for field myField). Property Name: @SomeAttribute ("myField"), Property Value: value=theValue, maps to: SomeAttribute("myField").value(theValue).

Field-level property (e.g., for field myField): Property NameProperty Value @SomeAttribute("myField") name1=value1, name2=value2, maps to: SomeAttribute("myField").name1(value1).name2(value2) . . . .

Method-level property (e.g., for method myMethod(int x)): Property NameProperty Value @SomeAttribute ("myMethod(int x)")value=theValue, maps to: SomeAttribute("myMethod(int x)").value(theValue).

Method-level property (e.g., for method myMethod(int x))>Property Name: @SomeAttribute("myMethod(int x)"), Property Value: name1=value1, name2=value2, maps to: SomeAttribute("myMethod(int x)").name1 (value1).name2(value2) . . . .

The benefits of this simple mapping are that there is no need to implement a complex parser for attribute property file syntax, and the dynamic attribute processor does not need to be altered to accommodate new attributes that may be defined in the future. The methodology enables dynamically generating and compiling a class containing attributes from a component's property file. The dynamic attributes class is loaded before subclass generation when a component is instantiated. The methodology of the present invention also provides a simple automated mapping between attribute syntax in property files and attribute syntax as expressed in generated source code.

Inheriting Attributes from Classes

Attributes can be inherited from superclasses. For example:

```
1:    public abstract class MyClass
2:    {
3:        public static final Component component = new Component(MyClass.class);
4:
5:        public static MyClass getInstance( )
6:        {
7:            return (MyClass)component.getInstance( );
8:        }
9:
10:       /**
11:       ** @djc.TraceMethod
12:       **/
13:       public int add(int x, int y)
14:       {
15:           return x + y;
16:       }
17:   }
18:
19:   public abstract class MyBetterClass extends MyClass
20:   {
21:       public static final Component component = new Component(MyBetterClass.class);
22:
23:       public static MyClass getInstance( )
24:       {
25:           return (MyClass)component.getInstance( );
26:       }
27:
28:       public int subtract(int x, int y)
29:       {
30:           return x - y;
31:       }
32:   }
```

In the above example, the "MyBetterClass" component inherits the tracing attribute from the "add(int x, int y)" method in the "MyClass" class. The methodology of the present invention provides for dynamically generating, compiling, loading, and creating an instance of subclass of a declared component class with attributes inherited from a superclass.

Inheriting Attributes from Interfaces

Attributes can also be inherited from interfaces as shown in the following example:

```
1:    public interface MockObject
2:    {
3:        public static final Attribute[ ] attributes =
4:        {
5:            new MockAttribute( )
6:        };
7:
8:        // code for MockAttribute inner class omitted for brevity
9:
10:       public ExpectedCall addExpectedCall(Object expectedCall);
11:
12:       public void verifyExpectedCalls( );
13:   }
14:
15:   public abstract class MockConnection implements java.sql.Connection, MockObject
16:   {
17:       public static final Component component = new Component(MockConnection.class);
18:
19:       public static MockConnection getInstance( )
20:       {
21:           return (MockConnection)component.getInstance( );
22:       }
23:   }
```

This approach is particularly useful for class-level unit testing.

The following code sample shows how "mock objects" can be programmed with expected calls, then calls can be made, and then how it can be verified that the expected calls were made.

```
1:    public class MyTest
2:    {
3:        public void showMockObjectInUse( )
4:        {
5:            MockConnection mc = MockConnection.getInstance( );
6:            mc.addExpectedCall
7:            (
8:                new Object( )
9:                {
10:                   public PreparedStatement prepareStatement (String sql)
11:                   {
12:                       assertEquals("insert into Customer values (?, ?)", sql);
13:                       return MockPreparedStatement.getInstance( );
14:                   }
15:               }
16:           );
17:           mc.addExpectedCall
18:           (
19:               new Object( )
20:               {
21:                   public PreparedStatement prepareCall(String sql)
22:                   {
```

```
23:              assertEquals("update Customer set na
me = ?
where id = ?", sql);
24:              return MockCallableStatement.getInsta
nce( );
25:          }
26:        }
27:      );
28:      mc.addExpectedCall
29:      (
30:          new Object( )
31:          {
32:              public void commit( )
33:              {
34:              }
35:          }
36:      );
37:      PreparedStatement ps = mc.prepareStatement(
"insert
into Customer values (?, ?)");
38:      CallableStatement cs = mc.prepareCall("updat
e Customer
set name = ? where id = ?");
39:      mc.commit( );
40:      mc.verifyExpectedCalls( );
41:    }
42:  }
```

In this manner the present invention provides for dynamically generating, compiling, loading, and creating an instance of a subclass of a declared component class with attributes inherited from an interface. The instance of the dynamically generated subclass can then "mock" the behavior of an arbitrary interface. Through programming "mock objects" by adding expected calls as instances of anonymous inner classes, runtime introspection may be applied by a generated component subclass to determine and later verify the sequence of expected calls.

Inheriting Attributes from Packages

In each Java package a class named "PackageInfo" can optionally be defined, and the package may have its own attributes. The package-level attributes are automatically inherited by any class defined within the package as provided in the below example:

```
1:   package com.example;
2:
3:   /**
4:   ** @djc.ProfilePublicMethods
5:   **/
6:   public class PackageInfo
7:   {
8:   }
9:
10:  public abstract class MyClass
11:          // automatically inherits package-level ProfileAtt
ribute
12:  {
13:      public static final Component component = new
Component(MyClass.class);
14:
15:      public static MyClass getInstance( )
16:      {
17:          return (MyClass)component.getInstance( );
18:      }
19:
20:      public int add(int x, int y)
21:      {
22:          return x + y;
23:      }
24:  }
```

In this way, it is very easy to apply one or more attributes to an entire package. Both static and dynamic attributes can be used.

Attribute Overriding

It is not uncommon for several attributes to be specified for a method, where one of the attributes should take precedence over (i.e., override) the others. There are two main reasons why this is useful. First, to handle the case where the code generated by one attribute would interfere with the correct operation of the code generated by another. Second, to avoid multiple copies of the code being generated for an attribute, due to the same attribute being inherited twice, or being specified for a class or method when it has already been inherited. For each attribute encountered, if the attribute "overrides" any previously encountered attribute, the previously encountered attribute is dropped. Attributes are encountered in the following order: (1) package-level attributes; (2) attributes inherited from superclasses; (3) attributes inherited from interfaces; (4) static attributes for the component; and (5) dynamic attributes for the component. When defining an attribute class, an "overrides" method can be defined to specify whether the attribute should override another attribute. An example of this is shown in the "TraceAttribute" code described above. The base attribute class also defines a default "overrides" method. In this fashion, attribute overriding can be controlled using a method declared on the attributed class.

Attribute Weaving

Since attributes are declarative, and may be placed in a variety of locations (superclasses, interfaces, packages, classes, comments, or property files), it is not generally safe to assume that code generation should proceed in the same order that the attributes were initially encountered. After override checking, and before code generation, the attributes that are to be applied to a method must therefore be sorted (i.e., weaved). A predefined sort order applies to all predefined attributes. In the event that newly defined (e.g., user-defined) attributes are used, or that the predefined sort order is not appropriate in a certain situation, the sort order can be overridden using a "SortOrder" attribute. This can be specified at any level, but package-level would be recommended to avoid unnecessary repetition. The following is an example of the definition of a "SortOrder" attribute:

```
1:   /**
2:   ** @djc.SortOrder(order = { TransactionAttribute.cla
ss,
PermitAccessAttribute.class })
3:   **/
4:   public class PackageInfo
5:   {
6:   }
```

A definition such as the above would have the effect of allowing code generated for transaction management to precede code generated for enforcing role-based security constraints, which is probably not advisable. The above-described sort order attribute can be used for controlling attribute weaving.

It should be noted that the attributes provided by the present invention are very flexible and may also implement other more complicated behavior. For example, one attribute may examine all of the other attributes that have been used and decide to generate its code differently based upon the other attributes that are present. Accordingly, the above examples of overriding and weaving of attributes are for purposes of illustrating the interaction of attributes and not for purposes of limitation. Those skilled in the art will appreciate that attributes can be defined to be very flexible as to the code that they generate based on a number of different factors, including other attributes that are being used and the classes, methods, and fields in which the attributes are placed.

Self Registration

In the currently preferred embodiment, at a minimum a single class must be defined for each component. A developer can easily create a component from a class by following the pattern described above. When a component is first instantiated, a property file is automatically created in the configuration repository if one does not already exist. In this way, components can be seen as self-registering. Since property files permit dynamic reconfiguration (via dynamic attributes), and since the configuration repository can be queried for components and the dynamic metadata is readily available, it is relatively straightforward to develop a powerful data-driven component management infrastructure (GUI and script-based configuration tools). This feature of the present invention also enables the developer to easily determine what components have been used and where they are located in a given program.

While the invention is described in some detail with specific reference to a single-preferred embodiment and certain alternatives, there is no intent to limit the invention to that particular embodiment or those specific alternatives. For instance, a Java language embodiment is not required, as the present invention may be embodied using other programming languages. Those skilled in the art will appreciate that modifications may be made to the preferred embodiment without departing from the teachings of the present invention.

The invention claimed is:

1. A computer-implemented method for dynamically generating program code adding behavior to a program based on attributes, the method comprising:
    adding a static component object to a program class of the program to create a component;
    defining at least one attribute specifying declaratively behavior to be added to the program, wherein said at least one attribute comprises active metadata used to generate program code from said at least one attribute for inclusion in the program;
    associating said at least one attribute with the component; and
    in response to instantiation of the component at runtime, generating a subclass that extends the program class, the generated subclass including additional dynamically generated program code, wherein the additional dynamically generated program code is based on said active metadata used to generate program code from said at least one attribute for inclusion in the program.

2. The method of claim 1, wherein the generating step includes generating a subclass comprising an instance of a declared component class.

3. The method of claim 1, wherein the generating step includes generating a subclass comprising an instance of component class declared as abstract.

4. The method of claim 1, wherein said defining step includes defining at least one attribute based on comments in source code of the program class.

5. The method of claim 4, further comprising:
    precompiling a class containing static attributes from said comments.

6. The method of claim 5, further comprising:
    loading the class containing static attributes before subclass generation when a component is instantiated.

7. The method of claim 4, further comprising:
    defining an automated mapping between attribute syntax in comments and attribute syntax as expressed in generated program code.

8. The method of claim 1, wherein said defining step includes defining at least one attribute in a property file external to the program class.

9. The method of claim 8, further comprising:
    compiling a class containing dynamic attributes from said property file.

10. The method of claim 9, further comprising:
    loading the class containing dynamic attributes before subclass generation when a component is instantiated.

11. The method of claim 8, further comprising:
    defining an automated mapping between attribute syntax in a property file and attribute syntax as expressed in generated program code.

12. The method of claim 8, wherein attributes in the property file comprise property name and property value pairs.

13. The method of claim 1, wherein said defining step includes defining attributes for a superclass from which the program class inherits.

14. The method of claim 1, wherein said defining step includes defining attributes for the program class' package from which the program class inherits.

15. The method of claim 1, wherein said defining step includes defining attributes for an interface from which the program class inherits.

16. The method of claim 15, wherein said generating step includes generating an instance of a subclass to mock the behavior of the interface.

17. The method of claim 1, wherein said generating step includes generating code for a non-abstract method body based on an attribute defined for an abstract method.

18. The method of claim 1, wherein said generating step includes generating program code based on comments in a source file.

19. The method of claim 1, further comprising:
    adding expected calls as instances of anonymous inner classes of the program;
    applying runtime introspection by a generated subclass to verify a sequence of expected calls.

20. The method of claim 1, wherein the component registers itself with a repository when the component is initially activated.

21. The method of claim 20, wherein the repository can be queried to determine components that are active.

22. The method of claim 1, further comprising:
    a computer-readable medium having processor-executable instructions for performing the method of claim 1.

23. The method of claim 1, further comprising:
    a downloadable set of processor-executable instructions for performing the method of claim 1.

24. A system for dynamically generating program code based on declarative attributes, the system comprising:
    a computer having a processor and memory;
    a component module for creating a component from a program class based on adding a static component object to the program class;
    an attribute module for defining at least one declarative attribute specifying behavior to be added to the program class and associating said at least one attribute with the component, wherein said at least one declarative attribute comprises active metadata used to dynamically generate program code for inclusion in a subclass of the program class; and a module for generating the subclass of the program class that extends the program class in response to instantiation of the component, the subclass including additional dynamically generated program code, wherein the additional dynamically generated program code is based on said active metadata used to generate program code for inclusion in the program of said at least one declarative attribute.

25. The system of claim 24, wherein the subclass adds tracing behavior to a program.

26. The system of claim 24, wherein the subclass is a subclass of an abstract class.

27. The system of claim 24, wherein the attribute module provides for defining at least one attribute based on comments in source code of the program class.

28. The system of claim 27, further comprising: a precompiler for precompiling a class containing static attributes from said comments.

29. The system of claim 28, wherein the module for generating loads the class containing static attributes before subclass generation.

30. The system of claim 27, further comprising:
an automated mapping between attribute syntax in comments and attribute syntax as expressed in generated program code.

31. The system of claim 24, wherein the attributed module provides for defining at least one attribute in a property file external to the program class.

32. The system of claim 31, further comprising:
a module for compiling a class containing dynamic attributes from said property file.

33. The system of claim 32, wherein the module for generating loads the class containing dynamic attributes before subclass generation when a component is instantiated.

34. The system of claim 31, further comprising:
an automated mapping between attribute syntax in a property file and attribute syntax as expressed in generated program code.

35. The system of claim 31, wherein attributes in a property file comprise property name and property value pairs.

36. The system of claim 24, wherein the attribute module provides for defining attributes for a superclass from which the program class inherits.

37. The system of claim 24, wherein the attribute module for provides for defining attributes for an interface from which the program class inherits.

38. The system of claim 37, wherein the module for generating generates an instance of a subclass to mock the behavior of the interface.

39. The system of claim 24, wherein the module for generating generates code for a non-abstract system body based on an attribute defined for an abstract method.

40. The system of claim 24, wherein the module for generating includes generating program code based on comments in a source file.

41. The system of claim 24, wherein the component registers itself with a repository when the component is initially activated.

42. The system of claim 41, wherein the repository can be queried to determine components that are active.

43. A computer-implemented method for adding behavior to an application without access to application source code, the method comprising:
defining at least one attribute specifying declaratively behavior which is desired to be added to an application without access to the application source code, wherein said at least one attribute comprises active metadata used to generate code adding behavior to the application;
storing said at least one attribute in a properties file external to the application;
processing, by a property file processor, the properties file external to the application to generate a dynamic attributes class based on the properties file;
loading the dynamic attributes class based on the properties file, prior to generating a subclass;
compiling the application and the dynamic attributes class; and
generating a subclass which includes dynamically generated code adding behavior to the application based on said at least one attribute.

44. The method of claim 43, wherein said defining step includes defining a particular attribute using active metadata, so as to provide a mechanism for generation of program code from said particular attribute.

45. The method of claim 44, wherein said active metadata dynamically generates code for inclusion in the subclass.

46. The method of claim 43, wherein said defining step includes defining an attribute for overriding a method of the application.

47. The method of claim 43, wherein said defining step includes defining an attribute for extending a method of the application.

48. The method of claim 43, further comprising:
defining an automated mapping between attribute syntax in the properties file and attribute syntax as expressed in generated program code.

49. The method of claim 43, wherein said at least one attribute in the properties file comprise property name and property value pairs.

50. The method of claim 43, wherein said processing step includes generating a dynamic attributes class using a precompiler.

51. The method of claim 43, wherein said processing step includes generating a dynamic attributes class at runtime.

52. The method of claim 43, wherein said compiling step includes using a Java compiler (JAVAC).

53. The method of claim 43, wherein said generating step includes using a precompiler.

54. The method of claim 43, wherein said generating step includes using a runtime compiler.

55. The method of claim 43, further comprising:
a computer-readable medium having processor-executable instructions for performing the method of claim 43.

56. The method of claim 43, further comprising:
a downloadable set of processor-executable instructions for performing the method of claim 43.

* * * * *